United States Patent [19]

Stinton et al.

[11] Patent Number: 5,672,420

[45] Date of Patent: Sep. 30, 1997

[54] HIGH TEMPERATURE CERAMIC ARTICLES HAVING CORROSION RESISTANT COATING

[75] Inventors: David P. Stinton; Woo Y. Lee, both of Knoxville, Tenn.

[73] Assignee: Lockheed Martin Energy Systems, Inc., Oak Ridge, Tenn.

[21] Appl. No.: 624,839

[22] Filed: Mar. 22, 1996

[51] Int. Cl.[6] ................................... D04H 1/58
[52] U.S. Cl. ............... 428/288; 210/505; 210/510.1; 428/304.4; 428/367; 428/375; 428/378; 428/408
[58] Field of Search .................. 210/505, 510.1; 428/288, 304.4, 367, 375, 378, 408

[56] References Cited

U.S. PATENT DOCUMENTS

| | | | |
|---|---|---|---|
| 5,035,923 | 7/1991 | Sarin | 427/255 |
| 5,075,160 | 12/1991 | Stinton et al. | 428/282 |

OTHER PUBLICATIONS

N. S. Jacobson, "Corrosion of Silicon–Based Ceramics in Combustion Environments", *J. Am. Ceram. Soc.*, 76, 3 (1993).

M. G. Lawson, F. S. Pettit, and J. R. Blachere, "Hot Corrosion of Alumina", *J. Mater. Res.*, 8, 1964 (1993).

J. I. Federer, "High Temperature Corrosion of Heat Exchanger Materials", *Proceedings of the Symposium on Corrosion and Corrosive Degradation of Ceramics*, pp. 425–443, edited by R. E. Tressler and M. McNallan, published by The American Ceramic Society, Westerville, OH, 1990.

R. L. Jones, "The Development of Hot Corrosion Resistant Zirconia Thermal Barrier Coatings", *Proceedings of the 1990 Coatings for Advanced Heat Engines Workshop*, pp. II–67–76, Castine, Maine, Aug. 1990.

J. I. Federer, "Evaluation of Ceramic Coatings on Silicon Carbide", *Surf. Coat. Tech.*, 39/40, 71 (1989).

J. R. Price and M. van Roode, "Corrosion Resistant Coatings for Silicon Carbide", *Proceedings of the Symposium on Corrosion and Corrosive Degradation of Ceramics*, pp. 469–493, edited by R. E. Tressler and M. McNallan, published by The American Ceramic Society, Westerville, OH, 1990.

M. van Roode, J. R. Price, and R. E. Gildersleeve, and C. E. Smeltzer, "Ceramic Coatings for Corrosion Environment", *Ceram. Eng. Sci. Proc.*, 9, 1245 (1988).

K. N. Lee, R. A. Miller, and N. S. Jacobson, "Development of Thermal Shock Resistant Mullite Coatings on Silicon Carbide", *Ceramic Transactions*, vol. 38, *Advances In Ceramic Matrix Composites*, pp.565–575, edited by N. P. Bansal, published by The American Ceramic Society, Westerville, OH, 1994.

K. N. Lee and R. A. Miller, "Long–Term Durability of Mullite–Coated Silicon–Based Ceramics", in *Proceedings of the 18th Annual Conference on Composites and Advanced Ceramic Materials*, Cocoa Beach, FL, 1994.

D. Suryanarayana, "Oxidation Kinetics of Aluminum Nitride", *J. Am. Ceram. Soc.*, 73, 1108 (1990).

R. G. Smith, J. H. Eaton, D. D. Johnson, E. A. Richards, "Fabrication of Full Scale Fiber Reinforced Hot Gas Filters By Chemical Vapor Deposition", *Proceedings of the Seventh Annual Conference on Fossil Energy Related Materials*, pp. 119–127, Oak Ridge, TN, May 11–13, 1993, compiled by N. C. Cole and R. R. Judkins, Report No. ORNL/FMP–93/1, Oak Ridge National Laboratory.

W. Y. Lee, W. J. Lackey, and P. K. Agrawal, "Kinetic and Thermodynamic Analyses of Chemical Vapor Deposition of Aluminum Nitride", *J. Am. Ceram. Soc.*, 74, 1821 (1991).

D. P. Stinton and D. W. Graham, "Chemical Vapor Deposition of $Ta_2O_5$ Corrosion Resistant Coatings", *Proceedings of the 1992 Coatings for Advanced Heat Engines Workshop*, pp. IV–65–77, Monterey, California, Aug. 3–6, 1990.

*Primary Examiner*—James J. Bell
*Attorney, Agent, or Firm*—Joseph A. Marasco

[57] ABSTRACT

A ceramic article which includes a porous body of SiC fibers, $Si_3N_4$ fibers, SiC coated fibers or $Si_3N_4$ coated fibers, having at least one surface, the article having a coating of AlN adherently disposed throughout at least a portion of the porous body.

6 Claims, 1 Drawing Sheet

HIGH TEMPERATURE CERAMIC ARTICLES HAVING CORROSION RESISTANT COATING

The United States Government has rights in this invention pursuant to contract no. DE-AC05-84OR21400 between the United States Department of Energy and Lockheed Martin Energy Systems, Inc.

FIELD OF THE INVENTION

The present invention relates to improved high temperature ceramic articles, and more particularly to such articles which have a corrosion resistant coating of AlN thereon.

BACKGROUND OF THE INVENTION

Silicon based ceramics such as SiC, $Si_3N_4$ and their composites have been developed for use in high temperature structural applications. Upon oxidation, a thin $SiO_2$ scale forms on the surface of the Si-based materials. Since $SiO_2$ is highly impervious to the diffusion of oxygen, the formation of the oxide scale retards further oxidation of the underlying ceramic. While they are highly oxidation resistant, Si-based materials can be susceptible to corrosion induced by deposits containing corrodants such as $Na_2SO_4$, $Na_2CO_3$, and oxide slags[1]. In certain gas turbine, heat engine, and fossil environments, $Na_2SO_4$ forms in the gas phase as a result of reactions between fuel and air impurities. Depending on temperature and pressure conditions, $Na_2SO_4$ can condense onto the surface of an Si-based component and subsequently destroy the protective $SiO_2$ scale by forming molten sodium silicates at temperatures above 850° C. The reaction likely proceeds in a manner shown by the following equation:

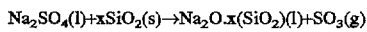

$$Na_2SO_4(l) + xSiO_2(s) \rightarrow Na_2O \cdot x(SiO_2)(l) + SO_3(g)$$

Once the protective $SiO_2$ layer is consumed by the formation of the molten sodium silicate layer, the rate of the oxidation process is no longer limited by the supply of oxygen through the scale. Therefore, if the corrodants are continually present in the system, the formation and dissolution of $SiO_2$ at the surface are sustained, resulting in rapid surface recession and undesirable microstructural changes.

Therefore, corrosion protection of Si-based materials is desirable for its robust utilization in high temperature environments. A protective coating is needed which functions as a physical as well as chemical barrier between corrodants and Si-based materials. However, in order to develop a suitable coating system, a set of very challenging materials criteria must be met. None of the criteria set forth hereinbelow should be compromised to satisfy other criteria:

1. A candidate coating material should be intrinsically resistant to the corrodants.
2. A candidate coating material should be thermodynamically and kinetically stable with respect to the products of oxidation and corrosion reactions.
3. A candidate coating material should be able to withstand residual and thermal stresses associated with processing and thermal cycling in order to maintain coating adherence and durability; the coefficient of thermal expansion (CTE) of the coating material and the substrate should be matched as closely as possible.
4. A candidate coating material should be compliant, a property which largely depends on its Young's modulus in a direction parallel to the substrate.
5. A candidate coating material should have a pin-hole and microcrack free microstructure.

In briefly reviewing the corrosion resistance of bulk ceramics, pure $Al_2O_3$ is proven to be highly resistant to $Na_2SO_4$ corrosion because of its relative stability with respect to $Na_2O$[2,3]. $Y_2O_3$ stabilized $ZrO_2$ (YSZ) is also observed to be corrosion resistant[3], but may be susceptible to structural destablization due to $Y_2O_3$ leaching by some corrodants[4]. Unfortunately, $Al_2O_3$ and YSZ in the form of coatings do not adhere well to SiC and $Si_3N_4$ substrates because of relatively large CTE mismatches[5-7]. On the other hand, mullite ($3Al_2O_3 \cdot 2SiO_2$) has a CTE value similar to that of SiC[8,9] whereas its intrinsic resistance to hot corrosion appears to be not as good as that of the other oxides[3]. Plasma spraying has been mainly used to deposit thick mullite coatings (0.58 to 0.99 mm) on SiC[5-9]. Some of the mullite based coatings provided protection up to 500 hours in a corrosive environment containing $Na_2CO_3$ at 1200° C.[5]. However, the presence of porosity and microcracks in such coatings eventually allowed corrosion products such as sodium aluminum silicates to form at the substrate interface.

Hot gas filters are required for cleaning gas streams prior to entering gas turbines in pressurized fluidized bed combustion, integrated coal gasification combined cycle systems, and other advanced combustion systems. Conventional filters are generally comprised of SiC particulates dispersed in a clay or glassy binder. Such filters typically fail because of thermal or mechanical shock, or corrosion of the binder phase. Fiber reinforced hot gas filters have been recently introduced which consist of continuous ceramic fibers for strength and durability and chopped fibers for porosity control. The entire structure is then overcoated with theoretically dense SiC to rigidize the filter and improve the corrosion resistance. Unfortunately, at 870° C., a typical operating temperature of the filters, sodium species condense on the filter, corrode the SiC overcoat and degrade the properties of the filter. Currently available fiber reinforced hot gas filters, usually with a chemically vapor deposited SiC matrix or binder, are subject to hot corrosion of the SiC under adverse combustion conditions. Means is needed for protecting the SiC from sodium corrosion up to a temperature of about 870° C., or even as high as 1000° C.

Several protective coatings have been investigated in recent years, with no success. One such coating was chemically vapor deposited alumina. However, the mismatch in thermal expansion between SiC and alumina was so great that the coatings cracked and spalled off of the substrates. Beta alumina coatings were then investigated because of their reduced coefficient of thermal expansion. These chemically vapor deposited coatings were very difficult to apply and also proved ineffective because of reaction with sodium species. A third material that was investigated was $Ta_2O_5$. Unfortunately, it reacted very readily with sodium sulfate under some conditions.

Chemically vapor deposited mullite ($3Al_2O_3 \cdot 2SiO_2$) coatings are currently under study. However crystalline coatings with the appropriate stoichiometry are very difficult to apply and maintain, as noted hereinabove.

Various materials applied by thermal spraying methods have also been investigated. However, they are not appropriate because thick coatings would blind the filter.

For further helpful information, please refer to the following patents and publications:

1. U.S. Pat. No. 5,075,160, issued Dec. 24, 1991, the entire disclosure of which is hereby incorporated herein by reference.
2. U.S. Pat. No. 5,035,923, issued Jul. 30, 1991.
3. N. S. Jacobson, "Corrosion of Silicon-Based Ceramics in Combustion Environments", *J. Am. Ceram. Soc.*, 76, 3 (1993).

4. M. G. Lawson, F. S. Pettit, and J. R. Blachere, "Hot Corrosion of Alumina", *J. Mater. Res.*, 8, 1964 (1993).

5. J. I. Federer, "High Temperature Corrosion of Heat Exchanger Materials", *Proceedings of the Symposium on Corrosion and Corrosive Degradation of Ceramics*, pp. 425–443, edited by R. E. Tressler and M. McNallan, published by The American Ceramic Society, Westerville, Ohio, 1990.

6. R. L. Jones, "The Development of Hot Corrosion Resistant Zirconia Thermal Barrier Coatings", *Proceedings of the 1990 Coatings for Advanced Heat Engines Workshop*, pp. II-67–76, Castine, Maine, August 1990.

7. J. I. Federer, "Evaluation of Ceramic Coatings on Silicon Carbide", *Surf. Coat. Tech.*, 39/40, 71 (1989).

8. J. R. Price and M. van Roode, "Corrosion Resistant Coatings for Silicon Carbide", *Proceedings of the Symposium on Corrosion and Corrosive Degradation of Ceramics*, pp. 469–493, edited by R. E. Tressler and M. McNallan, published by The American Ceramic Society, Westerville, Ohio, 1990.

9. M. van Roode, J. R. Price, and R. E. Glidersleeve, and C. E. Smeltzer, "Ceramic Coatings for Corrosion Environment", *Ceram. Eng. Sci. Proc.*, 9, 1245 (1988).

10. K. N. Lee, R. A. Miller, and N. S. Jacobson, "Development of Thermal Shock Resistant Mullite Coatings on Silicon Carbide", *Ceramic Transactions*, Vol. 38, *Advances In Ceramic Matrix Composites*, pp.565–575, edited by N. P. Bansal, published by The American Ceramic Society, Westerville, Ohio, 1994.

11. K. N. Lee and R. A. Miller, "Long-Term Durability of Mullite-Coated Silicon-Based Ceramics", in *Proceedings of the 18th Annual Conference on Composites and Advanced Ceramic Materials*, Cocoa Beach, Fla., 1994.

12. D. Suryanarayana, "Oxidation Kinetics of Aluminum Nitride", *J. Am. Ceram. Soc.*, 73, 1108 (1990).

13. R. G. Smith, J. H. Eaton, D. D. Johnson, E. A. Richards, "Fabrication of Full Scale Fiber Reinforced Hot Gas Filters By Chemical Vapor Deposition", *Proceedings of the Seventh Annual Conference on Fossil Energy Related Materials*, pp. 119–127, Oak Ridge, Tenn., May 11–13, 1993, compiled by N. C. Cole and R. R. Judkins, Report No. ORNL/FMP-93/1, Oak Ridge National Laboratory.

14. W. Y. Lee, W. J. Lackey, and P. K. Agrawal, "Kinetic and Thermodynamic Analyses of Chemical Vapor Deposition of Aluminum Nitride", *J. Am. Ceram. Soc.*, 74, 1821 (1991).

15. D. P. Stinton and D. W. Graham, "Chemical Vapor Deposition of $Ta_2O_5$ Corrosion Resistant Coatings", *Proceedings of the 1992 Coatings for Advanced Heat Engines Workshop*, pp. IV-65–77, Monterey, Calif., Aug. 3–6, 1990.

OBJECTS OF THE INVENTION

Accordingly, it is an object of the present invention to provide a new and improved adherent, corrosion resistant coating for ceramic articles which are used in high temperature corrosive environments.

It is another object of the present invention to provide a coated high temperature ceramic article, the coating providing inertness with respect to corrodants such as sodium species, thus isolating the corrodants from the ceramic article.

Further and other objects of the present invention will become apparent from the description contained herein.

SUMMARY OF THE INVENTION

In accordance with one aspect of the present invention, the foregoing and other objects are achieved by a ceramic article which includes a porous body of SiC fibers, $Si_3N_4$ fibers, SiC coated fibers or $Si_3N_4$ coated fibers, having at least one surface, the article having a coating of AlN adherently disposed throughout at least a portion of the porous body.

In accordance with another aspect of the present invention, a filter element for removing particulate matter from high temperature fluid streams includes:

a porous preform base fiber material of selected refractory fibers having a selected average pore size; and a coating of AlN on each of the refractory fibers of the preform of a thickness sufficient to provide corrosion resistance during use of the filter element.

Figure 1:
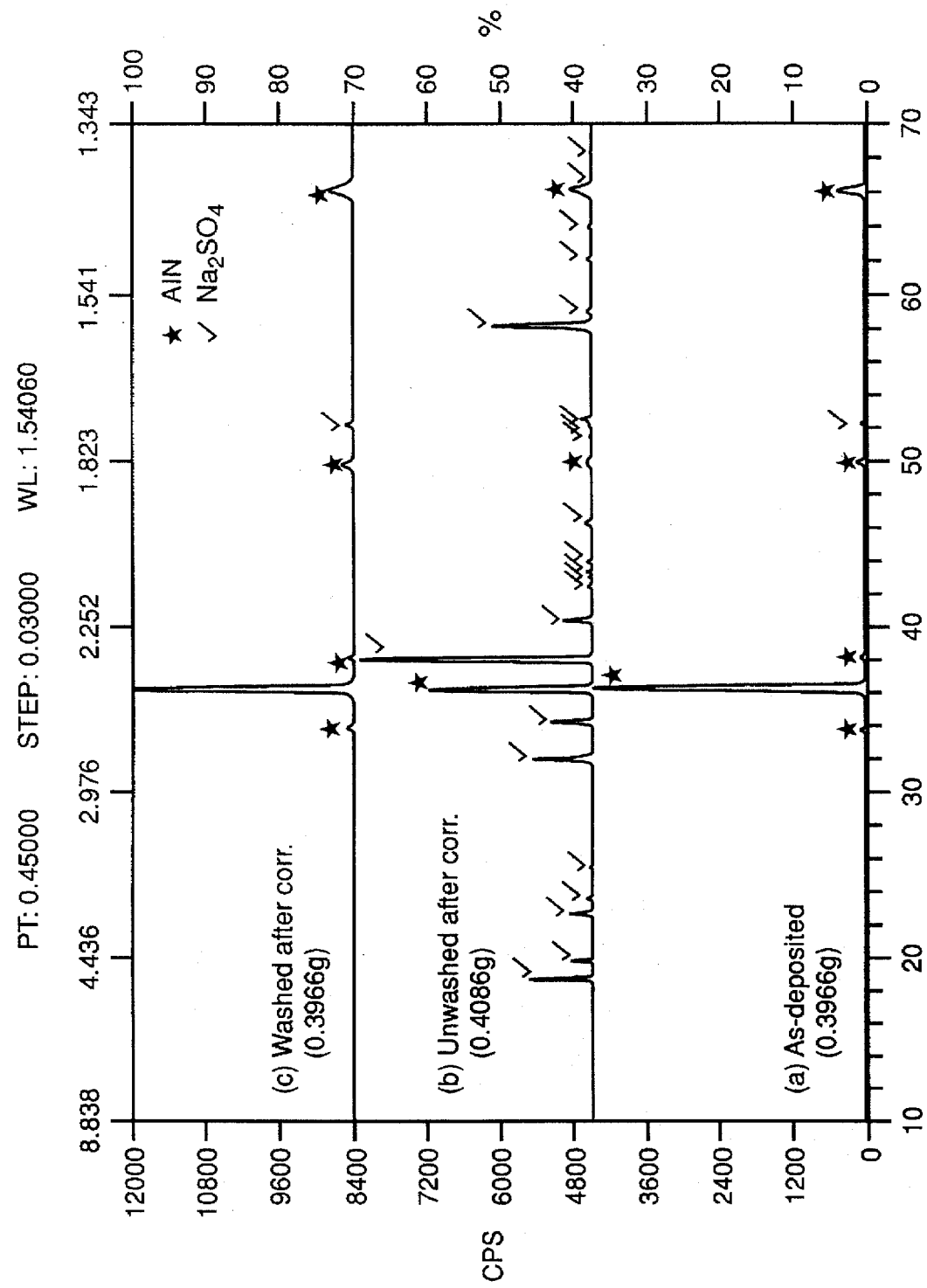
FIG. 1 is a graph showing corrosion resistance of an article prepared in accordance with the present invention.

For a better understanding of the present invention, together with other and further objects, advantages and capabilities thereof, reference is made to the following disclosure and appended claims in connection with the above-described drawings.

DETAILED DESCRIPTION OF THE INVENTION

AlN has been found to be an ideal coating material for corrosion protection of ceramic materials, especially hot gas filters, for at least the following reasons:

1. At temperatures below about 1000° C., AlN is intrinsically resistant to the corrodants that do the most damage to high temperature ceramic articles such as hot gas filters.

2. At temperatures below about 1000° C., AlN is thermodynamically and kinetically stable with respect to the products of oxidation and corrosion reactions.

3. AlN is able to withstand residual and thermal stresses associated with processing and thermal cycling in order to maintain coating adherence and durability; the coefficient of thermal expansion (CTE) of AlN and the substrate are very closely matched.

4. AlN is compliant, having an appropriate Young's modulus in a direction parallel to the substrate.

5. AlN coatings can be applied which have a pin-hole and microcrack free microstructure.

Oxidation of AlN to $Al_2O_3$ at temperatures of above 1000° C.[10] appears to limit the use of the coating to temperatures not exceeding 1000° C. in applications involving exposure of the article in oxygen containing atmospheres. However, for hot filter applications, temperature requirements are generally below 870° C.[11], but can vary from about 300° C. for gasification systems to about 900° C. for pressurized fluidized bed combusters. Furthermore, since AlN forms a highly corrosion resistant $Al_2O_3$ scale upon oxidation[2], AlN should be an ideal coating candidate to protect hot filters from hot corrosion.

Chemical vapor deposition (CVD) is a suitable method of preparing AlN coatings since a modified CVD technique[11] is currently used to fabricate hot filters from Si-based ceramic and glass fibers. The CVD method produces uniform, high purity, dense coatings throughout the filter. Other conventional coating deposition methods may be suitable for various applications of the present invention.

The AlN coating is useful for corrosion protection of many types of ceramic articles, especially ceramic fiber filters made of SiC fibers, $Si_3N_4$ fibers, SiC coated fibers or $Si_3N_4$ coated fibers.

EXAMPLE I

AlN was deposited on hot isostatically pressed $Si_3N_4$ (GN10, Allied Signal) by reacting $AlCl_3$ with $NH_3$ in a hot wall CVD reactor. The following processing conditions were used:

Temperature=900° C.

Pressure=0.66 kPa $NH_3$ flow rate=150 $cm^3$/min at STP

Ar flow rate=500 $cm^3$/min $Cl_2$ flow rate=30 $cm^3$/min $Cl_2$ gas was used to chlorinate Al pellets to produce $AlCl_3$ vapor. The above conditions were selected generally in view of the work of Lee et al.[12] The rate of coating growth was typically in the range of 5 to 10 μm/h. As shown in FIG. 1a, the X-ray diffraction (XRD) pattern of an AlN coating deposited on $Si_3N_4$ indicated that the coating was highly textured with a strong preferred orientation to the [002] direction. The coating was about 20 μm thick. The underlying $Si_3N_4$ substrate was not detected by the XRD analysis. The weight of the coated sample was 0.3966 g.

In order to evaluate the corrosion resistance of the coated sample, the sample was loaded with 13.4 mg/$cm^2$ of $Na_2SO_4$ and subsequently subjected to a flowing $O_2$ environment for 100 hours at 850° C. and 101 kPa. After the exposure to the corrosion treatment, the weight of the sample was 0.4086 g. The XRD pattern of the corroded sample shown in FIG. 1b crystalline $Na_2SO_4$ sample was covered with a layer of crystalline $Na_2SO_4$. The AlN coating underneath the $Na_2SO_4$ layer was also detected in the XRD pattern. When the sample was ultrasonically washed in warm distilled water, the $Na_2SO_4$ layer was dissolved in the water as evidenced by the disappearance of the $Na_2SO_4$ diffraction peaks in FIG. 1c. The weight of the washed sample was 0.3966 g which was identical to that measured before the corrosion test. These XRD and weight measurement data showed that the AlN coating was effective in protecting the $Si_3N_4$ substrate from $Na_2SO_4$ induced corrosion at 850° C.

While there has been shown and described what are at present considered the preferred embodiments of the invention, it will be obvious to those skilled in the art that various changes and modifications can be made therein without departing from the scope of the inventions defined by the appended claims.

What is claimed is:

1. A ceramic article comprising a porous body comprising at least one of: SiC fibers, $Si_3N_4$ fibers, SiC coated fibers or $Si_3N_4$ coated fibers, said article having a coating of AlN adherently disposed throughout at least a portion of said porous body.

2. A ceramic article in accordance with claim 1 wherein said body is a hot gas filter.

3. A ceramic article in accordance with claim 2 wherein said hot gas filter operates at a temperature in the range of about 700° C. to about 900° C.

4. A ceramic article in accordance with claim 1 wherein said coating is stable at a temperature not exceeding about 1000° C.

5. A filter element for removing particulate matter from high temperature fluid streams, which comprises:

a porous preform base fiber material of selected refractory fibers having a selected average pore size; and a coating of AlN on each said refractory fibers of said preform of a thickness sufficient to provide corrosion resistance during use of said filter element.

6. A filter element in accordance with claim 5 wherein said refractory fibers comprise at least one of SiC, $Si_3N_4$, SiC coated fibers or $Si_3N_4$ coated fibers.

* * * * *